(12) United States Patent
Tang et al.

(10) Patent No.: US 8,839,126 B1
(45) Date of Patent: Sep. 16, 2014

(54) SECURE HTML COMPONENTS FOR BUILDING CLIENT-SIDE USER INTERFACE

(75) Inventors: Na Tang, San Jose, CA (US); Ying Zhang, Palo Alto, CA (US); Yash Sekhon, Mountain View, CA (US); Zelidrag Hornung, Burlingame, CA (US)

(73) Assignee: Google Inc., Mountain View, CA (US)

( * ) Notice: Subject to any disclaimer, the term of this patent is extended or adjusted under 35 U.S.C. 154(b) by 1004 days.

(21) Appl. No.: 12/486,298

(22) Filed: Jun. 17, 2009

(51) Int. Cl.
*G06F 3/048* (2013.01)

(52) U.S. Cl.
USPC .......................................................... 715/764

(58) Field of Classification Search
USPC .......................................................... 715/764
See application file for complete search history.

(56) References Cited

U.S. PATENT DOCUMENTS

| | | | |
|---|---|---|---|
| 6,151,708 A * | 11/2000 | Pedrizetti et al. | 717/173 |
| 6,167,567 A * | 12/2000 | Chiles et al. | 717/173 |
| 6,353,926 B1 * | 3/2002 | Parthesarathy et al. | 717/170 |
| 6,763,403 B2 * | 7/2004 | Cheng et al. | 710/36 |
| 7,620,948 B1 * | 11/2009 | Rowe et al. | 717/171 |
| 7,788,662 B2 * | 8/2010 | Haselden et al. | 717/170 |
| 7,890,919 B1 * | 2/2011 | Williams | 717/100 |
| 2002/0194578 A1 * | 12/2002 | Irie et al. | 717/122 |
| 2003/0046676 A1 * | 3/2003 | Cheng et al. | 717/173 |
| 2003/0093678 A1 * | 5/2003 | Bowe et al. | 713/180 |
| 2004/0010786 A1 * | 1/2004 | Cool et al. | 717/170 |
| 2007/0169079 A1 * | 7/2007 | Keller et al. | 717/168 |
| 2009/0110199 A1 * | 4/2009 | Marlow et al. | 380/279 |

* cited by examiner

*Primary Examiner* — Omar Abdul-Ali
*Assistant Examiner* — Anil Bhargava
(74) *Attorney, Agent, or Firm* — Harrity & Harrity, LLP

(57) ABSTRACT

A method performed by a server device includes receiving a request from a client, the request including data to identify a component of a graphical user interface (GUI) application; and determining that an updated version of the component is available. The method also includes retrieving, from a memory associated with the server device, the updated version of the component and providing the updated version of the component to the client.

22 Claims, 9 Drawing Sheets

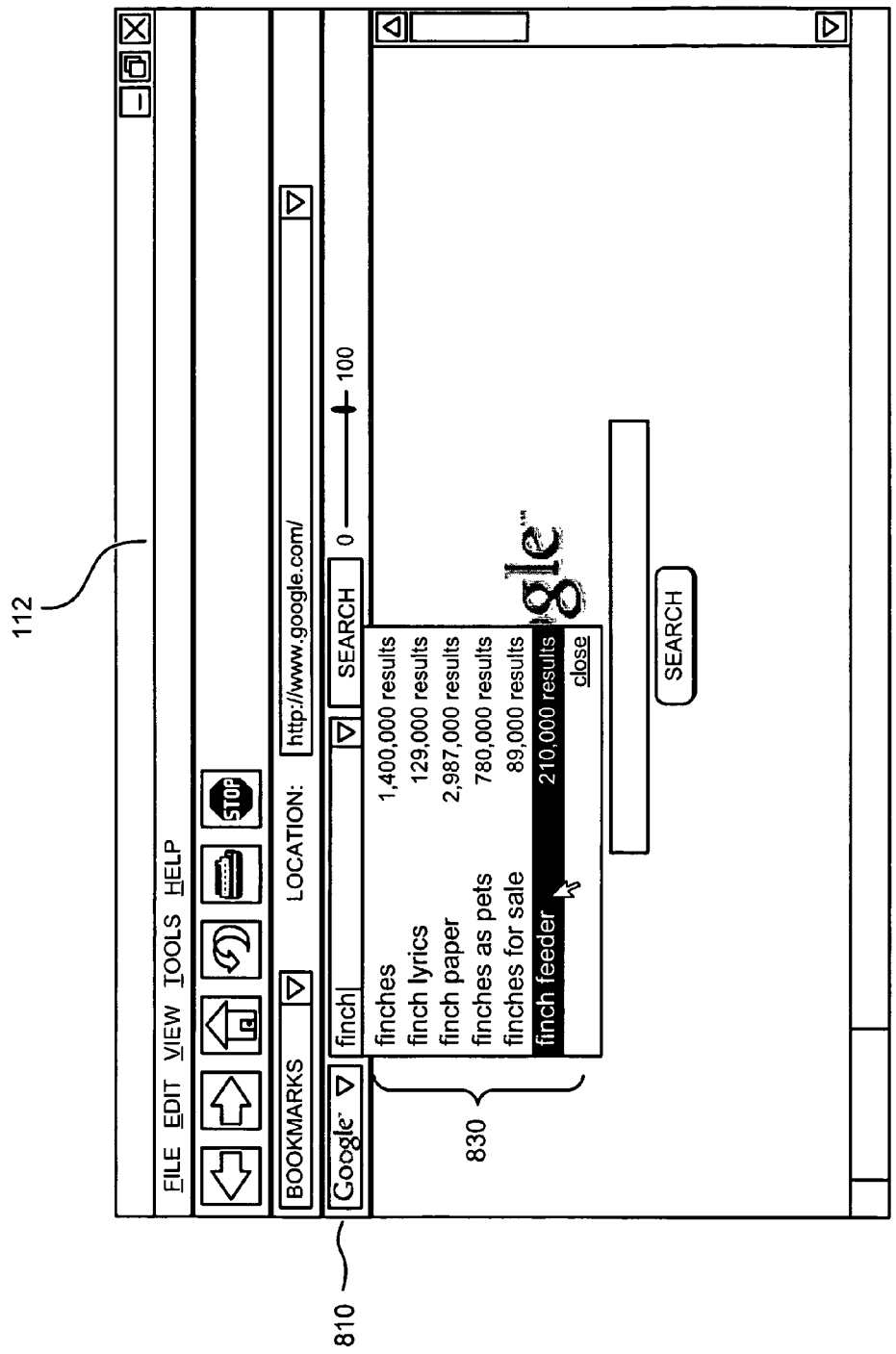

SECURE HTML COMPONENTS FOR BUILDING CLIENT-SIDE USER INTERFACE

BACKGROUND

Many companies currently offer graphical user interface (GUI) applications. GUI applications may include add-on applications, such as toolbars, to improve the user interface for an application, such as a web browser. Oftentimes, these add-on applications provide functionality that is not available in existing applications. For example, an add-on toolbar for a web browser may permit a user to perform a search right from the toolbar, permit terms to be highlighted on a web page, provide pop-up protection, and do other things to assist the user in finding information of interest.

Users currently download add-on applications to a user device as a complete binary code package that may be designated by a version number (e.g., version "1.0"). When updates to the add-on application are necessary, the add-on application provider may compile one or more improvements as a version upgrade (e.g., version "1.1") that can be downloaded by users to replace the previous version of the add-on application.

SUMMARY

According to one aspect, a method, performed by a server device, may include receiving, at the server device, a request from a client, the request including data to identify a component of a GUI application; and determining, by a processor of the server device, that an updated version of the component is available. The method may also include retrieving, from a memory associated with the server device, the updated version of the component and providing the updated version of the component to the client.

According to another aspect, a system may include a memory to store instructions and multiple components for a GUI application and a processor. The processor may execute instructions in the memory to receive a request ping from a client, the request ping including data to identify a particular component of the GUI application; determine that an updated version of the particular component is available in the multiple components; retrieve, from the multiple components, the updated version of the particular component; append a cryptographic signature to the updated version of the particular component; and provide, to the client, the updated version of the particular component with the cryptographic signature.

According to yet another aspect, a method, performed by a server device, may include receiving, at the server device, a request from a client, the request including data to identify a component of a GUI application rendered from binary code; retrieving, from a memory associated with the server device, an updated version of the component, the updated version of the component including mark-up language code that can be rendered at the client to incorporate the updated version of the component into the GUI application; and sending the updated version of the component to the client.

According to a further aspect, a system may include means for receiving a request from a client, the request including data to identify a particular component from a set of components of a GUI application; means for determining that an updated version of the particular component is available; means for retrieving, from the set of components, the updated version of the particular component; means for appending security information to the updated version of the particular component; and means for providing the updated version of the particular component with the security information to the client.

BRIEF DESCRIPTION OF THE DRAWINGS

The accompanying drawings, which are incorporated in and constitute a part of this specification, illustrate one or more embodiments described herein and, together with the description, explain the these embodiments. In the drawings:

FIGS. 8A-8B are diagrams illustrating an exemplary component update for a GUI application.

DETAILED DESCRIPTION

The following detailed description refers to the accompanying drawings. The same reference numbers in different drawings may identify the same or similar elements. Also, the following detailed description does not limit the invention.

Overview

Systems and/or methods described herein may update features of a client-side GUI application without requiring a download of a complete new version of the GUI application. A web-service may provide individual components that include mark-up defined content (e.g., Hypertext Mark-up Language (HTML)) for the GUI application that invokes additional functionality exposed by a base application. Authenticity of the mark-up defined content can be ensured via a cryptographic signature associated with the GUI application. Thus, implementations described herein may provide secure, web-based methods for updating a user interface of a client-side GUI application without redistributing the application's binary code.

A "GUI application" as the term is used herein, may be broadly interpreted to include application software with a graphical user interface. A GUI application may be a stand-alone application or an add-on application that may be integrated with base application software to enhance the base application software. For example, a GUI application may provide increased specialization or customization for a particular use. A "component," as the term is used herein, may be broadly construed to include a feature of a GUI application. A "base application," as the term is used herein, may be broadly construed to include an application into which an add-on application is integrated.

Figure 1:
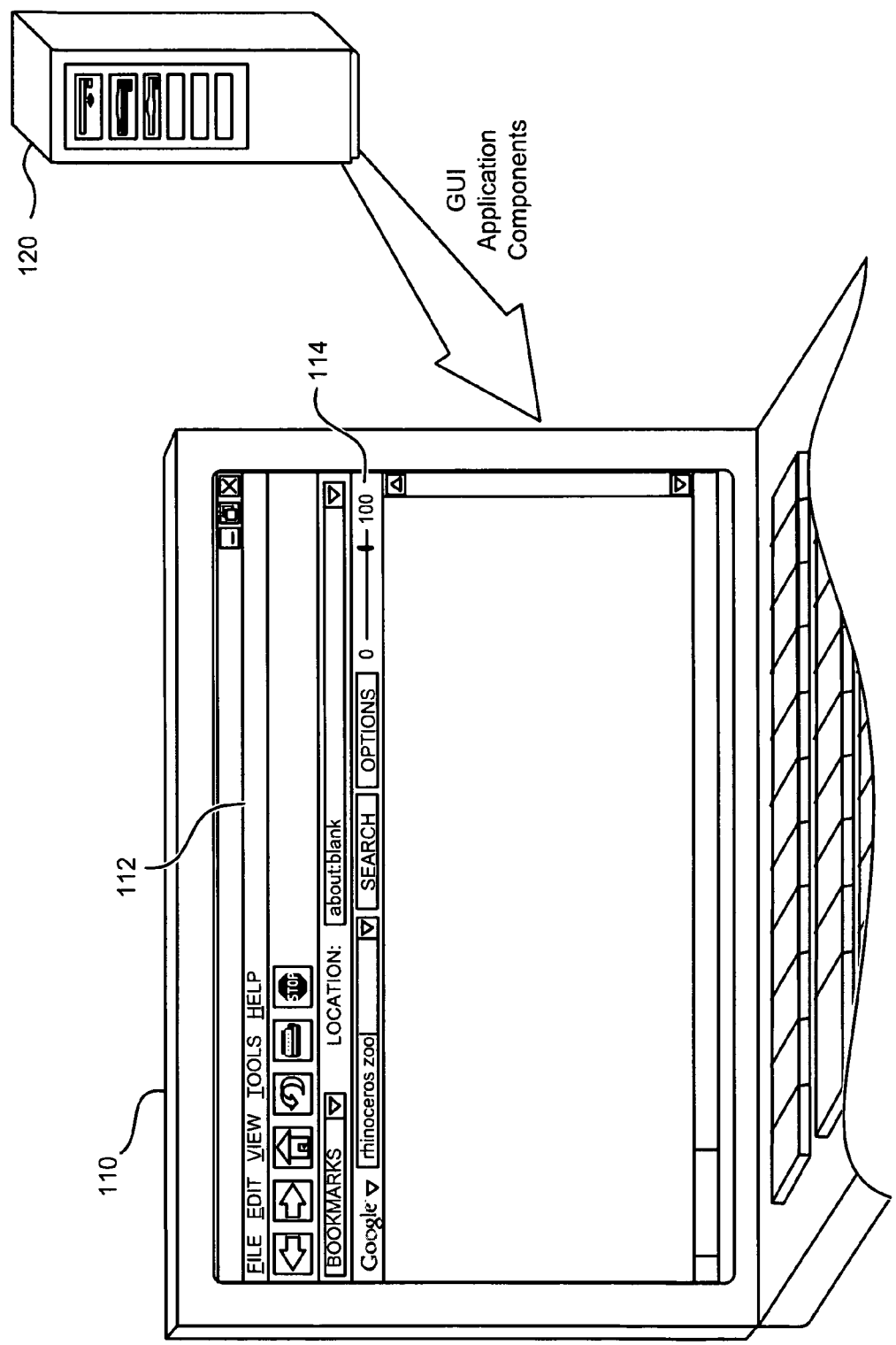
FIG. 1 is a diagram illustrating an exemplary concept described herein.

FIG. 1 is a diagram illustrating an exemplary concept described herein. As shown in FIG. 1, a user might use a computing device 110 to run an application, such as browser 112. Browser 112 may include a GUI application, such as user interface toolbar 114, that provides additional functionality to a base application, such as browser 112. The additional functionality may be provided within toolbar 114. For example, toolbar 114 may include features that allow a user to check spelling within web-page forms, highlight search terms within a web-page, provide a suggestion window for typed search terms, translate text from web pages to/from English, etc. Some or all features of toolbar 114 may be logically separated as individual components.

A user may install toolbar 114 in browser 112, for example, by downloading a binary code package from a server 120 to computing device 110. Computing device 110 may then perform installation functions to integrate toolbar 114 into browser 112. When subsequent upgrades or new features of toolbar 114 are developed, the upgrades and/or new features may be made available at server 120. In implementations described herein, the upgrades and/or new features may be requested by computing device 110 and provided by server 120 in a manner that is transparent to the user. The upgrades and/or new features may be provided as secure HTML components that can be downloaded and integrated individually into toolbar 114, without the need for a complete binary code download. The secure HTML components may be a mixture of code using mark-up language (e.g., HTML), style sheet language (e.g., cascading style sheets (CSS)) and/or scripting language (e.g., JavaScript™) that defines both functionality and the look-and-feel of certain parts of a GUI application. In other implementations, the secure HTML components may also include other programming architectures, such as Netscape™ Plugin Application Programming Interface (NPAPI) plug-ins, ActiveX™ plug-ins, Native Client code modules, plain text configuration files, image files and/or sound files. In an exemplary implementation, the components may be rendered via a native renderer in browser 112.

The implementation of a toolbar in a browser, shown in FIG. 1, is an illustrative example. In other implementations, systems and/or methods described herein may be used to provide updates to a wide variety of add-applications using secure HTML components. In still other implementations, systems and/or methods described herein may provide updates to non-GUI applications using, for example, a scripting language (e.g., JavaScript™) without the need for mark-up language (e.g., HTML).

Exemplary Network Configuration

Figure 2:
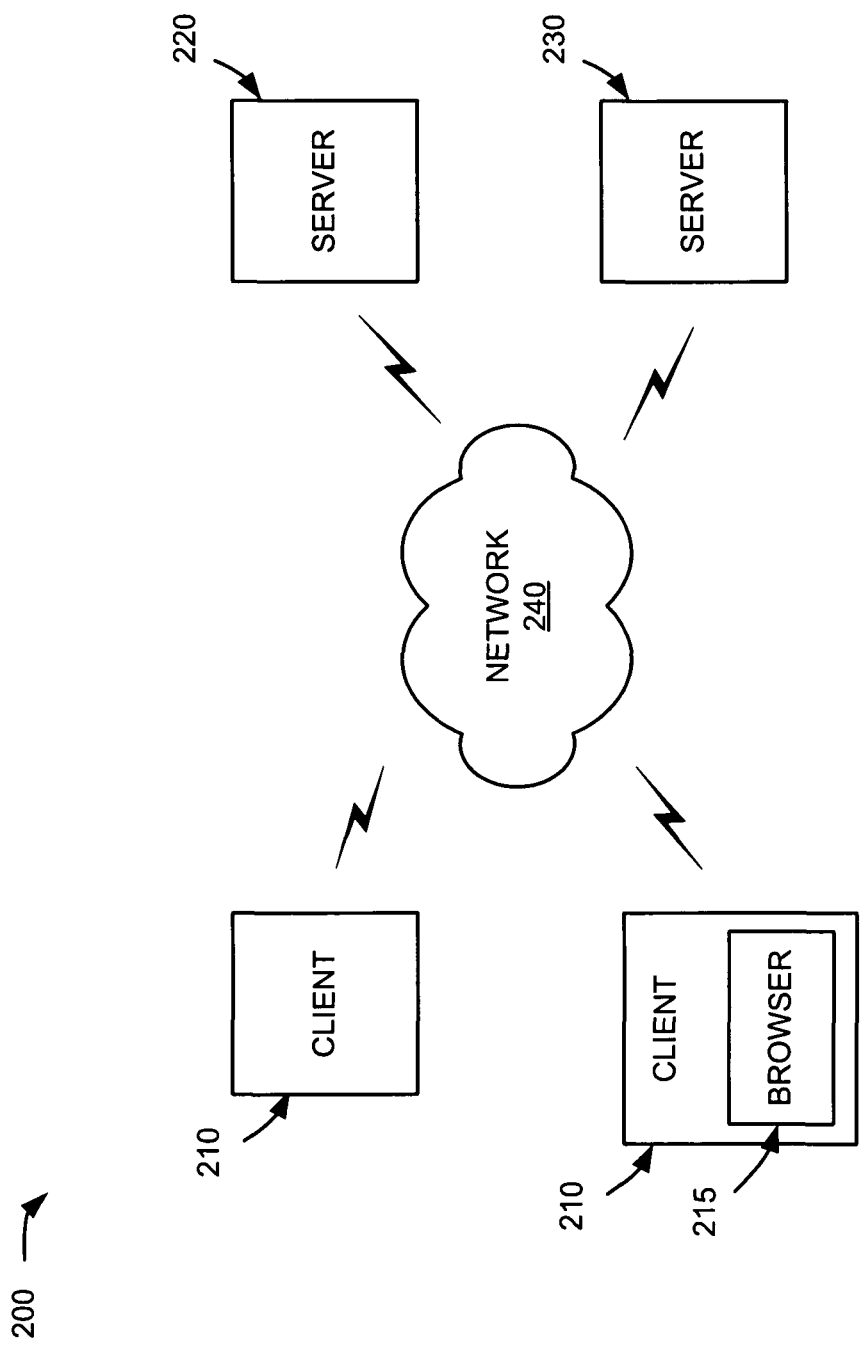
FIG. 2 is a diagram of an exemplary network in which systems and methods described herein may be implemented.

FIG. 2 is a diagram of an exemplary network 200 in which systems and methods described herein may be implemented. Network 200 may include multiple clients 210 connected to servers 220 and 230 via a network 240. Two clients 210 and two servers 220 and 230 have been illustrated as connected to network 240 for simplicity. In practice, there may be more or fewer clients and servers. Also, in some instances, a client may perform a function of a server or a server may perform a function of a client.

Clients 210 may include client entities. An entity may be defined as a device, such as a personal computer, a wireless telephone, a personal digital assistant (PDA), a lap top, or another type of computation or communication device. In one implementation, a client 210 may include a browser 215. Browser 215 may permit a user to access documents and may provide an interface to servers 220 and 230. Browser 215 may include a GUI application that may take the form of a toolbar or some other functionality that may operate separate from or in conjunction with browser 215. In another implementation, the GUI application may be integrated as part of browser 215. In some situations, the GUI application may operate as an interface between browser 215 and network 240.

Servers 220 and 230 may include server entities that store, retrieve, and/or provide applications and/or application components available for downloading to clients 210. In one implementation, server 220 may receive, interpret, and/or redirect requests, from clients 210, for upgrades to applications. Server 230 may store or maintain applications and/or application components that may be provided to clients 210 in response to upgrade requests. Such application components may include new and/or improved features for GUI applications currently residing on clients 210.

While servers 220 and 230 are shown as separate entities, it may be possible for one of server 220 or 230 to perform one or more of the functions of the other one of server 220 or 230. For example, it may be possible for both servers 220 and 230 to be implemented as a single server. It may also be possible for a single one of server 220 or 230 to be implemented as two or more separate (and possibly distributed) devices.

Network 240 may include a local area network (LAN), a wide area network (WAN), a telephone network, such as the Public Switched Telephone Network (PSTN) or a cellular network, an intranet, the Internet, or a combination of networks. Clients 210 and servers 220 and 230 may connect to network 240 via wired and/or wireless connections.

Exemplary Client/Server Architecture

Figure 3:
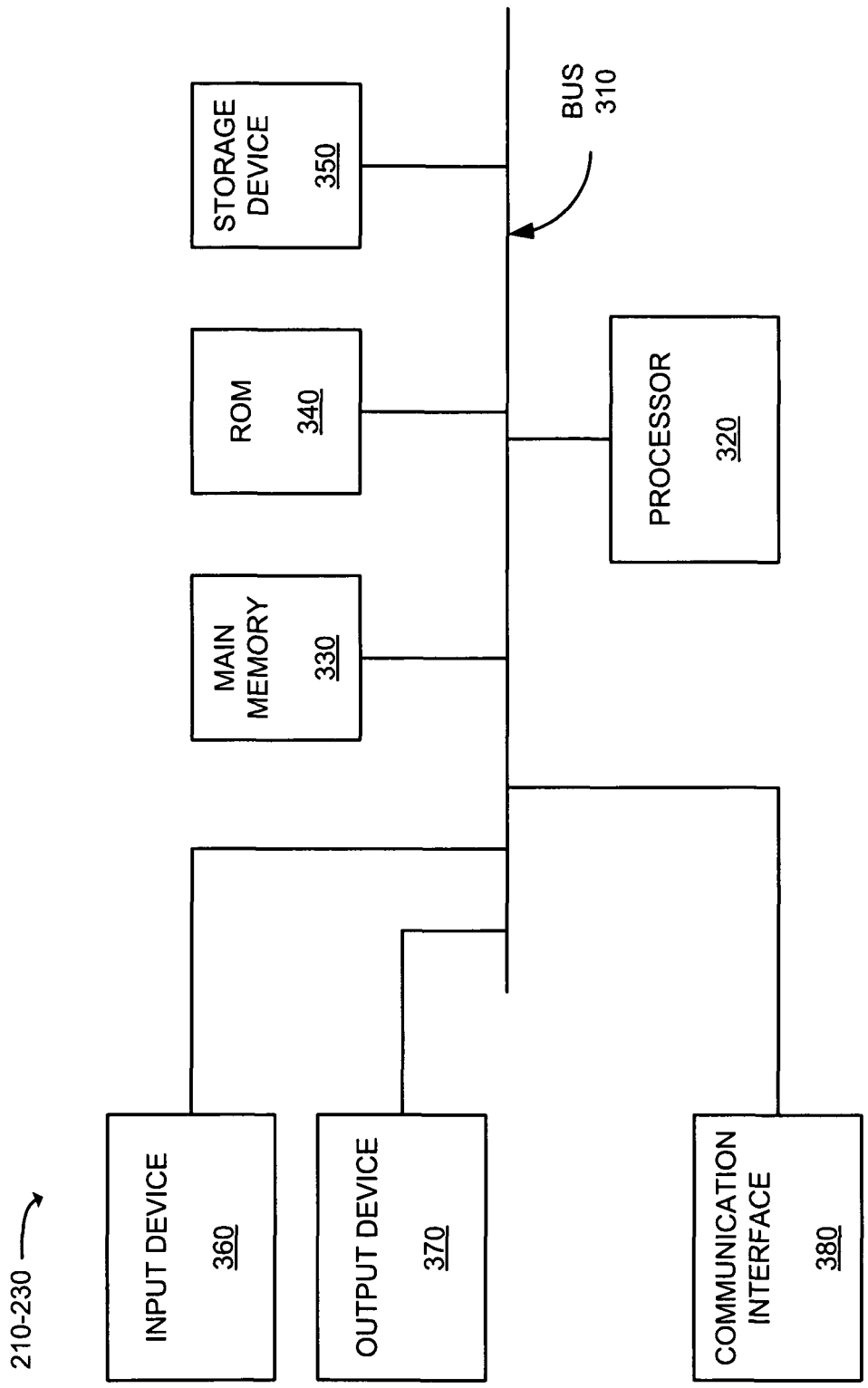
FIG. 3 is a diagram of an exemplary client or server of FIG. 2.

FIG. 3 is a diagram of exemplary parts of a client or server entity (hereinafter called "client/server entity"), which may correspond to one or more of clients 210 and/or servers 220 and 230. The client/server entity may include a bus 310, a processor 320, a main memory 330, a read only memory (ROM) 340, a storage device 350, an input device 360, an output device 370, and a communication interface 380. Bus 310 may include a path that permits communication among the parts of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 240.

As will be described in detail below, the client/server entity, as described herein, may perform certain operations relating to providing updated components for GUI applications. The client/server entity may perform these operations in response to processor 320 executing software instructions contained in a computer-readable medium, such as memory 330. A computer-readable medium may be defined as a physical or logical memory device. A logical memory device may include memory space within a single physical memory device or spread across multiple physical memory devices.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Figure 4:
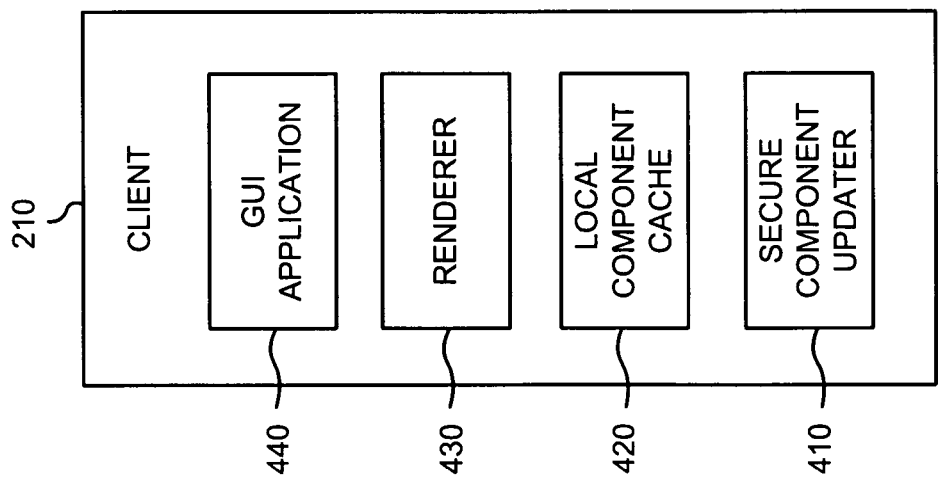
FIG. 4 is a block diagram of exemplary functional parts of a server of FIG. 2.

FIG. 4 is a block diagram of exemplary functional parts of client 210. The functional blocks illustrated in FIG. 4 may be implemented in hardware or a combination of software and hardware on client 210. While particular functional blocks are shown as being associated with client 210, any of these functional blocks may be implemented in client 210 or a combination of clients 210.

As shown in FIG. 4, client 210 may include secure component updater 410, local component cache 420, renderer 430, and GUI application 440. Although one secure component updater, one local component cache, one renderer, and one application are shown in FIG. 4, in other implementations, more or fewer secure component updaters, local component caches, renderers, or application may be included.

Secure component updater 410 may manage the retrieval of static component updates from an update server, such as server 220. Secure component updater 410 may request component updates and send received component updates to local component cache 420. Secure component updater 410 may request (e.g., using communication interface 380) component updates via a request ping to determine if there is an update for a requested component. A request ping may use hypertext transfer protocol secure (HTTPS) and may be provided, for example, to server 220 at regular intervals (e.g., once a day) or when instructed (e.g., by a user). The request ping may include information such as a name (or other identifier) and version indicator of a component file, a version indicator of the related application (e.g., a GUI application, such as a toolbar), the locale (e.g., an associated geographical region/language) of the related application, a unique identifier for the related application, etc.

When a component update is provided (in response to a request ping), secure component updater 410 may verify the electronic signature of the received component before sending the component to local component cache 420. In another implementation, instead of using a cryptographic signature, secure HTML components may be entirely encrypted with asymmetric or symmetric encryption algorithms. In one implementation, secure component updater 410 may be included in processor 320.

Local component cache 420 may store verified component uploads received from secure component updater 410. Local component cache 420 may also provide the verified component uploads to renderer 430 for building features of the GUI application into a base application. In one implementation, local component cache 420 may be included in main memory 330.

Renderer 430 may include a layout engine or rendering engine that incorporates a verified component from local component cache 420. Renderer 430 may use information from a downloaded version of the GUI application (e.g., binary code of a full version of application) and supplement the binary code with verified components from local component cache 420. For example, renderer 430 may incorporate HTML, CSS and/or JavaScript™ information from a component to present formatted content on a display (e.g., output device 370). In one implementation, render 430 may be included in an application (e.g., a browser) that is separate from the GUI application. Examples of renderer 430 may include ActiveX™ and GECKO™.

In an exemplary implementation, application logic in the updated component may interact with the rest of the GUI application exclusively though a JavaScript™ application programming interface (API). The GUI application's functionality may be exposed to the component's JavaScript via function extensions within JavaScript™ (e.g., "windows.external" functions). The GUI application may also implement certain JavaScript™ functions within the HTML component (e.g., to pass events from the GUI application to the HTML component). Thus, the interaction between the GUI application and the component happens via particular, function-specific API. In other implementations, the HTML component may include plug-ins that use direct communications to the rest of the GUI application instead of going exclusively through JavaScript™.

GUI application 440 may include a full-downloaded version of the GUI application (e.g., an add-on toolbar) in, for example, binary code. Renderer 430 may use GUI application 440 along with component upgrades from local component cache 420 to assemble an updated version of GUI application 440.

Although FIG. 4 shows exemplary functional components of client 210, in other implementations, client 210 may contain fewer, different, differently arranged, and/or additional functional components than depicted in FIG. 4. In still other implementations, one or more functional components of client 210 may perform one or more of the tasks described below as performed by one or more other functional components of client 210.

Figure 5:
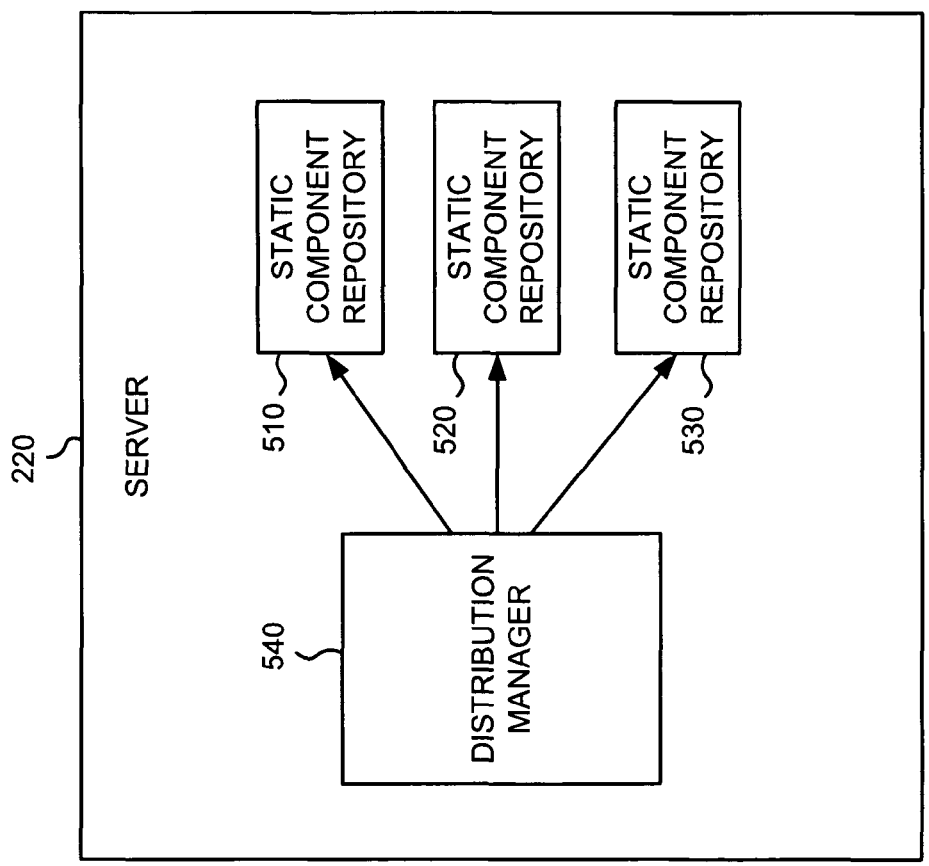
FIG. 5 is a block diagram of exemplary functional parts of a client of FIG. 2.

FIG. 5 is a block diagram of exemplary functional parts of server 220. Server 230 may be configured similarly. The functional blocks illustrated in FIG. 5 may be implemented in hardware or a combination of software and hardware on server 220. While particular functional blocks are shown as being associated with server 220, any of these functional blocks may be implemented in server 220 alone, server 230 alone, or a combination of server 220 and server 230.

As shown in FIG. 5, server 220 may include several static component repositories 510-530 and distribution manager 540. Although three static component repositories and one distribution component are shown in FIG. 5, in other implementations, more or fewer distribution managers and/or static component repositories may be included.

Static component repositories 510-530 may each include secure HTML components for GUI applications. Secure HTML components may include upgraded components for particular aspects of a GUI application. The components may be developed, for example, to address certain features of the GUI application that may be compartmentalized and, thus, upgraded without requiring a complete binary code rebuild. The components may be developed separately, finalized, and uploaded to one of static component repositories 510-530 for eventual retrieval in response to a request from distribution manager 540.

In one implementation, components within static component repositories 510-530 may be grouped according to functionality. Development teams may be responsible for separate functionalities and may be responsible only for a particular one or more of static component repositories 510-530 related to their functionalities. Thus, for example, static component repository 510 may include components related to search quality (e.g., search suggestion boxes); static component repository 520 may include components related to security (e.g., pop-up blockers); and static component repository 530 may include components related to translations (e.g., Chinese-to-English conversions). In one implementation, static component repositories 510-530 may be included in a memory (e.g., main memory 330 and/or one or more storage devices 350) of server 220. In another implementation, each of static component repositories 510-530 may be included in (or associated with) a memory of one or more separate servers.

Distribution manager 540 may receive a request ping from client 210 and, based on information in the request ping, determine whether an updated component is available. In one implementation, distribution manger 540 may maintain a directory of component updates from static component repositories 510-530 that may be used to compare information in a request ping with currently available components. Distribution manager 540 may send a reply to client 210 to provide an updated component or to indicate that no further updates are available for the component that is the subject of the request ping. For example, distribution manager 540 may review information in the request ping (e.g., the name and version of the component file, the version of the related GUI application, the locale of the client, etc.) and initiate delivery of an updated secure HTML component to client 210. In one implementation, distribution manager 540 may retrieve a component from one of static component repositories 510-530. In other implementations, distribution manager 540 may direct the request ping to a separate server that includes the static component repository 510-530 corresponding to the functionality defined in the request ping.

Distribution manager 540 may help to ensure that an HTML component is secure (not tampered) by, for example, conducting communication between server 220 and client 210 using HTTPS, encrypting the HTML component with a private/public key pair, and/or attaching a cryptographic signature in a comment section of the HTML component.

Although FIG. 5 shows exemplary functional components of server 220, in other implementations, server 220 may contain fewer, different, differently arranged, and/or additional functional components than depicted in FIG. 5. In still other implementations, one or more functional components of server 220 may perform one or more of the tasks described above as performed by one or more components of client 210.

Exemplary Processing

Figure 6:
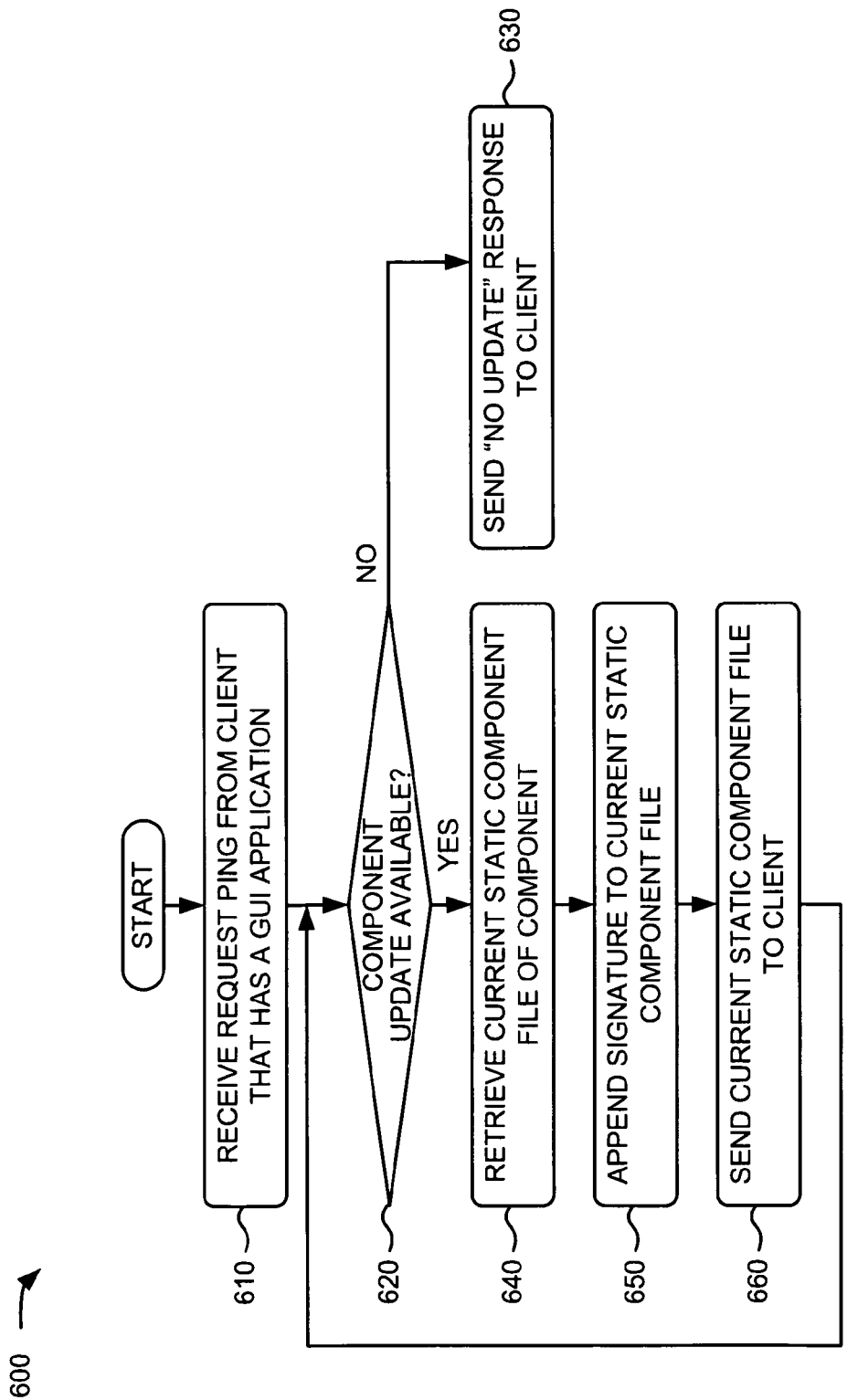
FIG. 6 is a flowchart of an exemplary process for providing component updates to a client.

FIG. 6 is a flowchart of an exemplary process 600 for providing component updates to a client. In one implementation, the processing of FIG. 6 may be performed by one or more software and/or hardware components within server 220 and/or server 230. In another implementation, the processing of FIG. 6 may be performed by one or more software and/or hardware components within server 220 and/or server 230 in combination with client 210.

Process 600 may begin with receiving a request ping from a client that has a GUI application (block 610). The client's GUI application may be, for example, a toolbar, a widget, or another application that includes features that can later be upgraded as distinct components. The GUI application file may include an identifier that is unique to the particular file. In one implementation, server 220 may send the GUI application (e.g., via network 240) to client 210 in response to a download request from a user of client 210. In one implementation, server 220 (e.g., distribution manager 540) may receive a request ping from client 210 via network 240. The request ping may serve as a trigger to check for updates of a particular component or multiple components associated with the previously provided GUI application. For example, in one implementation, the request ping may include information to identify a particular component for which the update is requested and the current version being used by client 210. In another implementation, the request ping may include an aggregated request for multiple components associated with a particular GUI application (or multiple GUI applications). If requests for multiple components are included in a single request ping, server 220 may process the request for each component individually, as described in the following blocks of process 600.

It may be determined if a component update is available (block 620). In one implementation, server 220 may compare information in the version of the component identified in the request ping with a directory of updates for the component. If the version of the component identified in the request ping is older than the version of the component in the directory of updates, then server 220 may determine that an update is required for the component at client 210.

If a component update is unavailable (block 620—NO), a "no update" response may be sent to the client (block 630). For example, if the version of the component identified in the request ping is the same as the version of the component in server 220's directory of updates, then server 220 may determine that no update is available and may send a response message to client 210 indicating that no update is available for the particular component. In another implementation, server 220 may aggregate "no update" responses or piggy-back "no update" responses with other messages to reduce network traffic. Sending a "no update" response may be optional. In another implementation, server 220 may not reply to a request ping for which updates are unavailable. In this case, client 210 may determine that no updates are available when no response to the request ping is received within a particular amount of time of sending the request ping.

If a component update is available (block 620—YES), a current static component file for the component may be retrieved (block 640). For example, if the version of the component identified in the request ping is older than the version of the component in server 220's directory of updates, server 220 (e.g., distribution manager 540) may retrieve (e.g., from one of static component repositories 510-530) a current version of the component for the GUI application.

A signature may be appended to the current static component file (block 650). For example, server 220 (e.g., distribution manager 540) may attach a signature to the original HTML content of the component as an HTML comment. The signature may include, for example, the unique identifier of the GUI application that was part of the request ping from client 210. In other implementations, other security and/or authentication measures may be used to allow client 210 to verify the origin of the component.

The current static component file may be sent to the client (block 660). For example, server 220 (e.g., distribution manager 540) may send the current static component file with the appended signature to client 210. The current static component file may include a single file or multiple associated files. In an exemplary implementation, the current static component file may be sent over network 240 using HTTPS or another secure transport protocol. In the event the request ping from client 210 included information for multiple components, process 600 may return to block 620 to process component updates for another component until all component information included in the request ping has been addressed.

While FIG. 6 provides an exemplary process for providing component updates to a client, other processes may be used to provide component updates. For example, in another implementation, server 220 may actively push updated HTML component updates to all known clients 210 (e.g., via network 240) and force/trigger each client 210 to install the updated components. For example, if client 210 is a mobile phone, the push could be initiated by server 220 using a data sort message service (SMS) message. As another example, client 210 may be a computer with a persistent Extensible Messaging and Presence Protocol (XMPP) connection over which server 220 can initiate the HTML component update process. Thus, component updates may be initiated by a server instead of a by a request ping from individual clients.

Figure 7:
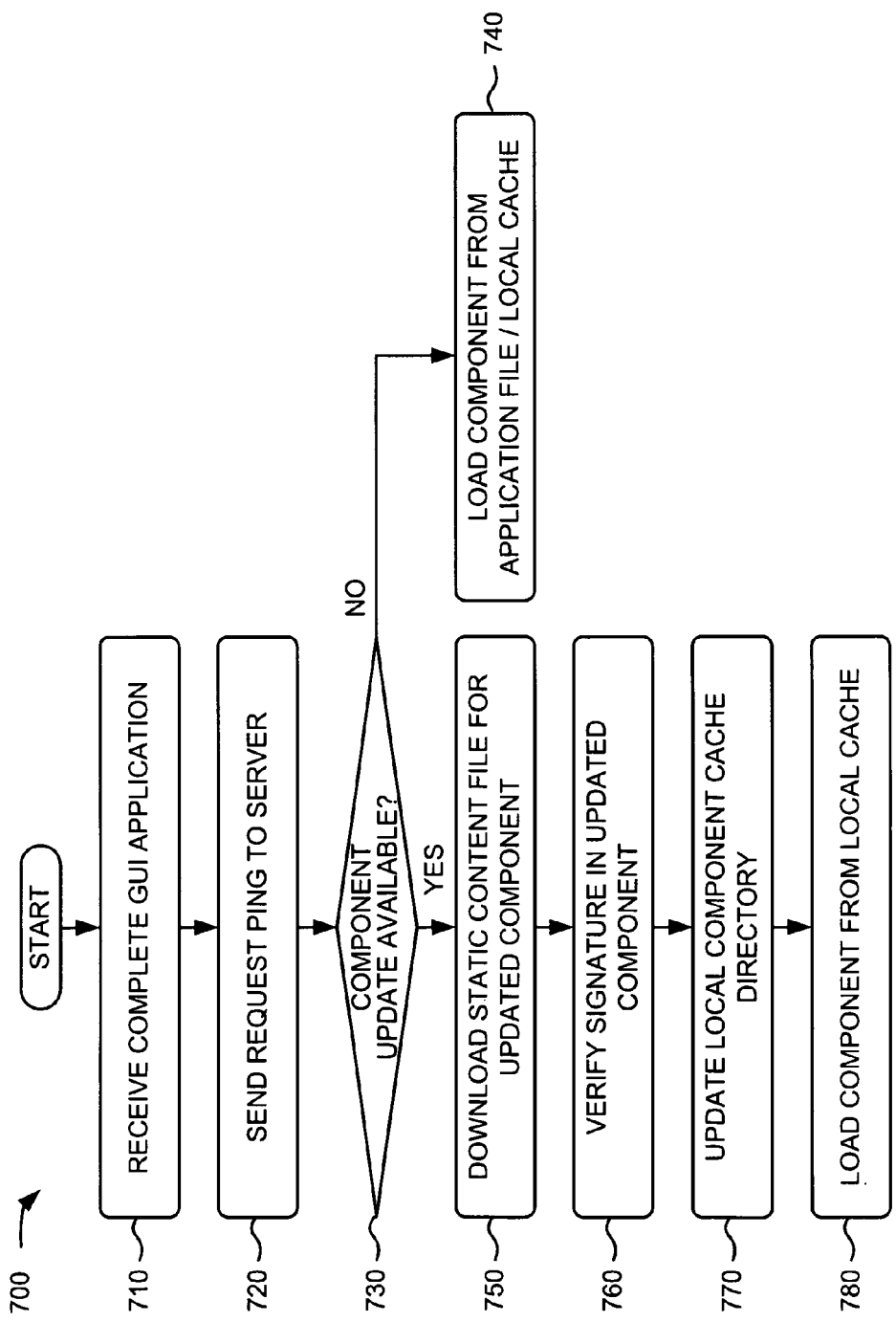
FIG. 7 is a flowchart of an exemplary process for downloading component updates from a server.

FIG. 7 is a flowchart of an exemplary process for downloading component updates from a server. In one implementation, the processing of FIG. 7 may be performed by one or more software and/or hardware components within client 210. In another implementation, the processing of FIG. 7 may be performed by one or more software and/or hardware components within client 210 in combination with server 220 and/or server 230.

Processing may begin with receiving a complete GUI application (block 710). The particular GUI application may include any type or form of GUI application selected in any manner by the user. For example, the user might select an add-on application (using e.g., browser 112) from a web site. The selection may cause a server associated with the web site to push a current version of the complete add-on application to client 210. In another example, client 210 may receive the complete GUI application as part of a software package for a separate program or as pre-loaded system software with the purchase of a computing device. The received GUI application may include features that can later be updated as distinct components.

A request ping may be sent to a server (block 720). For example, client 210 may send a request ping to server 220. The request ping may include information to identify one or more components for which updates are requested and the current version of each component being used by client 210 (e.g., in local component cache 420). In one implementation, client 210 may send a request ping at regular intervals (e.g., once a day, every other day, etc.). In another implementation, in addition to (or instead of) automatic request pings, a request ping may be initiated by a user of client device 210 whenever the user may be interested in checking for component updates.

It may be determined if a component update is available (block 730). In one implementation, client 210 may receive a response from server 220 indicating whether an update for the component is available. If a component update is not available (block 730—NO), the component may be loaded from the application file or the local cache (block 740). For example, upon a subsequent opening of the GUI application, client 210 (e.g., renderer 430) may load a previously stored version of the component. In one implementation, if there is no component update, client 210 (e.g., renderer 430) can pull the component content from either the built-in resource data (e.g., from binary code of GUI application 440) or a previously stored component version (e.g., stored in local component cache 420).

If a component update is available (block 730—YES), a static component file for the updated component may be downloaded (block 750). For example, client 210 may receive, from server 220, an updated static component file with an appended signature. The updated static component file with the appended signature may be downloaded in the background (e.g., transparent to the user) to avoid disruption of the user's activity with client 210. In one implementation, the appended signature may be included as an HTML comment that may be used by secure component updater 410 but ignored by renderer 430 when generating the component. The updated static component file with the appended signature may be received via network 240 using, for example, HTTPS.

The signature in the updated component may be verified (block 750). For example, client 210 (e.g., secure component updater) may verify that the signature in the HTML comment section matches a private key for the GUI application. If the signature is verified by client 210, the updated static component file may be stored locally in client 210 (e.g., stored in local component cache 420). If the signature cannot be verified by client 210, the updated static component file may be rejected (e.g., not stored in local component cache 420).

The local component cache directory may be updated (block 760). For example, assuming the signature of the static component file is verified, client 210 may update a directory for the local component cache to indicate the new component version.

The component may be loaded from the local cache (block 770). For example, upon a subsequent opening of the GUI application, client 210 (e.g., renderer 430) may load the most recent version of the component. The file signature of the component (e.g., the signature in the HTML comment) may also be checked when the static component update is loaded from the local disk (e.g., local component cache 420).

While FIG. 7 provides an exemplary process for receiving component updates from a server, other processes may be used to receive component updates. For example, in another implementation, a client 210 may receive (e.g., via network 240) an unsolicited update pushed from server 220.

EXAMPLE

Figure 8A:
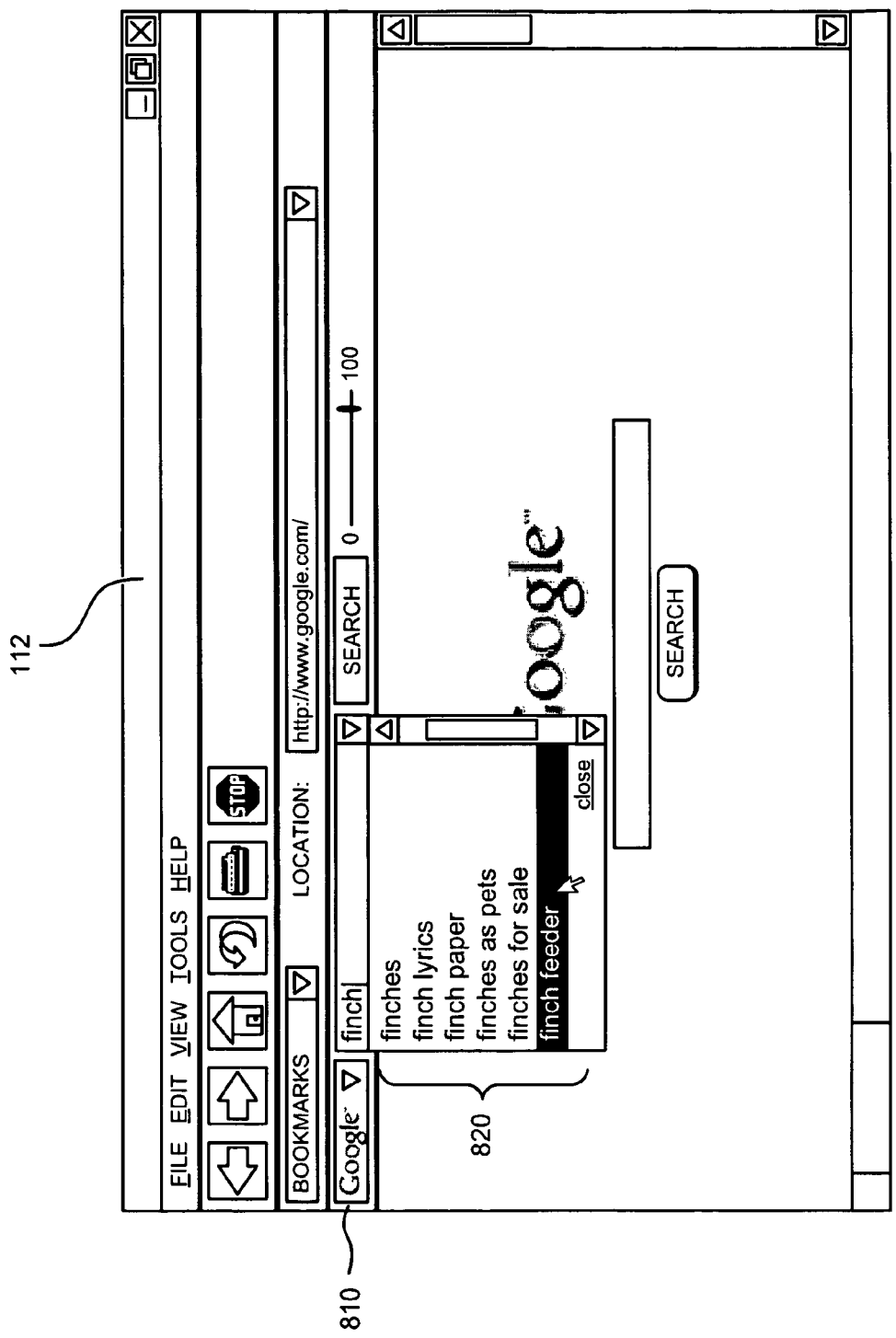

FIGS. 8A and 8B provide diagrams illustrating an exemplary component update for a GUI application according to implementations described herein. As shown in FIGS. 8A and 8B, add-on application 810 (i.e., a toolbar) may be implemented in browser 112. FIG. 8A provides an illustration of an add-on application including a feature (e.g., suggestion window 820) implemented using, for example, C++ code. FIG. 8B provides an illustration of a rewrite of the feature to a new rendering model (e.g., suggestion window 830) based, for example, on HTML and JavaScript.

Referring to FIG. 8A, add-on application 810 may include multiple features to improve the user interface for browser 112, including search suggestion window 820. For example, search suggestion window 820 may appear when a user enters a search term (e.g., "finch") in toolbar 810. Based on the user input, search suggestion window 820 may provide multiple other search terms that a user may select to initiate a search. The contents of search suggestion window 820 may be defined based on binary code for the add-on application.

Assume for the example of FIG. 8B, that an updated component for the search suggestion window is provided during the search operation of FIG. 8A and that a user then closes browser 112. The updated component may be provided as a new rendering model using HTML and JavaScript. The updated component may be provided for example, using the processes described above with respect to FIGS. 6 and/or 7.

As shown in FIG. 8B, when browser 112 is opened, browser 112 may build add-on application 810 using the new component file. Thus, when the user enters the same search term (e.g., "finch") in toolbar 820, search suggestion window 830 may appear. Based on new information from the updated component file, suggestion window 830 may provide a different user interface than was provided in suggestion window 820. For example, as shown in FIG. 8B, suggestion window 830 may include additional information (e.g., a number of search results associated with each search suggestion) that was not included in suggestion window 820. The update of the suggestion window feature of add-on application 810, thus, can be accomplished using a web-based interface without redistributing the binary code for the add-on application.

CONCLUSION

Systems and/or methods described herein may receive a request ping from a client, the request ping including data to identify a component of a GUI application, and determine if an updated version of the component is available. The systems and/or methods may also retrieve, from a memory, the updated version of the component and provide the updated version of the component to the client.

The foregoing description of implementations provides illustration and description, but is not intended to be exhaustive or to limit the invention to the precise form disclosed. Modifications and variations are possible in light of the above teachings or may be acquired from practice of the invention.

For example, another implementation may not include a local cache of component updates at a client (e.g., client 210), but instead provide updated components directly from a server (e.g., server 220). Thus, in this implementation, the server may provide real-time updates for components rather than updates in response to a request ping from a client.

Also, while series of blocks have been described with regard to FIGS. 6 and 7, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain implementations described herein may be implemented as "logic" or a "component" that performs one or more functions. This logic or component may include hardware, such as a processor, microprocessor, an application specific integrated circuit or a field programmable gate array, or a combination of hardware and software (e.g., software executed by a processor).

It should be emphasized that the term "comprises" and/or "comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method performed by a server device, the method comprising:
    receiving, at the server device, a request from a browser operating on a client, the request including data to identify the client and respective versions associated with components of an application provided through the browser, the client being associated with a private key;
    determining, by the server device and based on the request, that an updated version of a component, of the plurality of components, is available;
    determining, by the server device and based on the request, that the client has most recent versions of other components, of the plurality of components of the application, that differ from the component;
    retrieving, by the server device, data associated with the updated version of the component, the retrieving of the data including:
        comparing the version of the component, associated with the client, with the updated version of the component to produce comparison results,
        selecting, based on the comparison results, one of a plurality of data files, each of the plurality of data files being associated with upgrading a respective different version of the component to the updated version of the component, and
        retrieving the selected data file, other data files of the plurality of data files not being retrieved;
    signing, by the server device, the data associated with the updated version of the component, with a signature, the signature being based on the data included in the request, the signature enabling the browser to verify the data associated with the updated version using the private key; and
    providing, by the server device, the signed data associated with the updated version of the component to the client, data associated with the other components not being provided to the client device.

2. The method of claim 1, where the request further includes additional data that includes one or more of:
    respective identifiers associated with the components;
    respective version indicators of the components;
    a version indicator of the application; or
    information identifying a location associated with the client,
    the selecting of the data file, from the plurality of data files, being further based on the additional data.

3. The method of claim 1, where the component includes binary code, and where the data associated with the updated version of the component includes at least one of:
    mark-up language code; or
    script language code.

4. The method of claim 3, where the data associated with the updated version of the component includes the mark-up language code, and
    where the mark-up language code includes hypertext markup language (HTML).

5. The method of claim 3, where the data associated with the updated version of the component includes the script language code, and
    where the script language code includes JavaScript code.

6. The method of claim 1, where providing the signed data associated with the updated version of the component includes:

sending the signed data associated with the updated version of the component to the client using hypertext transfer protocol secure (HTTPS).

7. The method of claim 1,
where determining that the updated version of the component is available includes:
comparing the version, associated with the component of the application, to information in a directory of component updates, and
determining, based on the comparison, that the updated version of the component is available.

8. The method of claim 1, where retrieving the data associated with the updated version of the component includes:
selecting, based on the data in the request, a component database from a plurality of component databases; and
retrieving the updated version of the component from the selected component database.

9. The method of claim 1, where:
the data associated with the updated version of the component includes hypertext markup language (HTML), and
the signature is included as an HTML comment in the data associated with the updated version of the component.

10. A system, comprising:
a memory to store a plurality of instructions; and
a processor to execute instructions in the memory to:
receive a request from a browser operating on a client, the request including data identifying a plurality of components for an application installed on the client, the client being associated with a private key,
determine, based on the request, that an updated version of a particular component, of the plurality of components, is available,
determine, based on the request, that the client has most recent versions of other components, of the plurality of components of the application, that differ from the component,
retrieve data associated with the updated version of the particular component, the processor, when retrieving of the data, being further to:
compare the version of the component, associated with the client, with the updated version of the component to produce comparison results,
select, based on the comparison results, one of a plurality of data files, each of the plurality of data files being associated with upgrading a respective different version of the component to the updated version of the component, and
retrieve the selected data file, other data files of the plurality of data files not being retrieved,
append a cryptographic signature to the data associated with the updated version of the particular component, the cryptographic signature enabling the browser to verify the data associated with the updated version using the private key, and
provide, to the client, the signed data associated with the updated version of the particular component with the cryptographic signature without providing, to the client, data associated with the other components.

11. The system of claim 10, where the request further includes additional data that includes one or more of:
respective identifiers of the plurality of components;
respective version indicator of the plurality of components;
a unique identifier for the application; or
a version indicator of the application,
the processor being further to select the data file, from the plurality of data files, based on the additional data.

12. The system of claim 10, where the data associated with the updated version of the particular component includes one or more of:
mark-up language code;
script language code;
style sheet language code;
an image; or
a plain text configuration file.

13. The system of claim 10, where, when providing the data associated with the updated version of the particular component to the client, the processor executes instructions in the memory to:
send the signed data associated with the updated version of the particular component to the client using hypertext transfer protocol secure (HTTPS).

14. The system of claim 10, where, when determining that the updated version of the particular component is available, the processor executes instructions in the memory to:
compare the data in the request with a directory of component updates to identify that the updated version of the particular component is available.

15. The system of claim 10, where, when retrieving the data associated with the updated version of the particular component, the processor executes instructions in the memory to:
select, from a plurality of component databases, a component database that includes the updated version of the particular component; and
retrieve the data associated with the updated version of the particular component from the selected component database.

16. A method performed by a server device, the method comprising:
receiving, by the server device, a request from a client, the request including data identifying a plurality of components of an application rendered from binary code by the client, the client being associated with a private key;
retrieving, by the server device and based on the request, data associated with an updated version of a component, of the plurality of components, the data associated with the updated version of the component including mark-up language code that can be rendered at the client to incorporate the updated version of the component into the application, the retrieving of the data including:
comparing the version of the component, associated with the client, with the updated version of the component to produce comparison results,
selecting, based on the comparison results, one of a plurality of data files, each of the plurality of data files being associated with upgrading a respective different version of the component to the updated version of the component, and
retrieving the selected data file, other data files of the plurality of data files not being retrieved;
signing, by the server device, the data associated with the updated version of the component with a signature, the signature being based on the data included in the request, the signature enabling the client to verify the data associated with the updated version using the private key; and
sending, by the server device, the signed data associated with the updated version of the component, along with the signature, to the client, data associated with the other components not being sent to the client.

17. The method of claim 16, further comprising:
comparing, by the server device, the data, to identify the version of the component of the application, with a directory of component updates; and determining, by the server device, whether the data associated with the updated version of the component is stored in a memory associated with the server device based on a result of the comparing.

18. The method of claim 16, further comprising:

sending, by the server device, the data associated with the updated version of the component to the client using hypertext transfer protocol secure (HTTPS).

19. A non-transitory memory device comprising:

one or more instructions which, when executed by a processor, cause the processor to receive a request from a browser operating on a client, the request including data identifying a plurality of components of an application associated with the browser, the client being associated with a private key;

one or more instructions which, when executed by the processor, cause the processor to determine that an updated version of a particular component, of the plurality of components, is available;

one or more instructions which, when executed by the processor, cause the processor to determine, based on the request, that the client has most recent versions of other components, of the plurality of components of the application, that differ from the component;

one or more instructions which, when executed by the processor, cause the processor to retrieve data associated with the updated version of the particular component, the one or more instructions to retrieve the data including:

one or more instructions to compare the version of the component, associated with the client, with the updated version of the component to produce comparison results, one or more instructions to select, based on the comparison results, one of a plurality of data files, each of the plurality of data files being associated with upgrading a respective different version of the component to the updated version of the component, and one or more instructions to retrieve only the selected data file;

one or more instructions which, when executed by the processor, cause the processor to append a cryptographic signature to data associated with the updated version of the particular component, the cryptographic signature enabling the browser to verify data associated with the updated version using the private key; and one or more instructions which, when executed by the processor, cause the processor to provide, to the client, the data associated with the updated version of the particular component with the cryptographic signature, data associated with the other components not being provided to the client.

20. The non-transitory memory device of claim 19, where the request further includes additional data that include one or more of:

information identifying a location of the client;

an identifier of the particular component;

a version indicator of the particular component;

a unique identifier for the application; and a version indicator of the application, and the one or more instructions to select the data file further include:

one or more instructions to select the data file, from the plurality of data files, further based on the additional data.

21. The non-transitory memory device of claim 19, where the data associated with the updated version of the particular component further includes one or more of:

script language code;

style sheet language code;

an image; or a plain text configuration file.

22. The non-transitory memory device of claim 19, where the one or more instructions to determine that an updated version of the particular component is available include:

one or more instructions to compare the data in the request with a directory of component updates to identify the particular component of the application.

\* \* \* \* \*